Sept. 12, 1933.   F. X. LAUTERBUR ET AL   1,926,681
WATER SOFTENING SYSTEM
Filed April 12, 1929    4 Sheets-Sheet 4
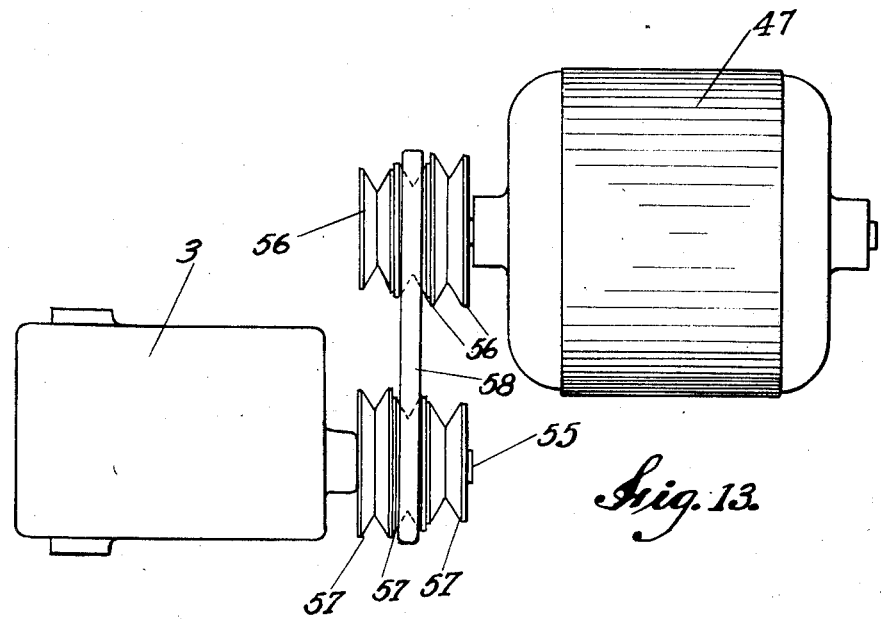
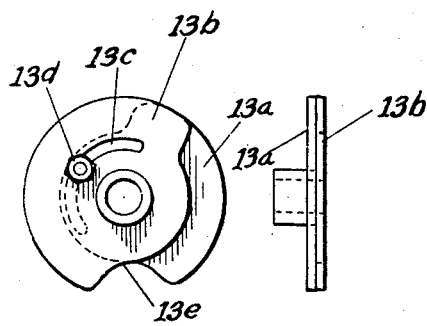
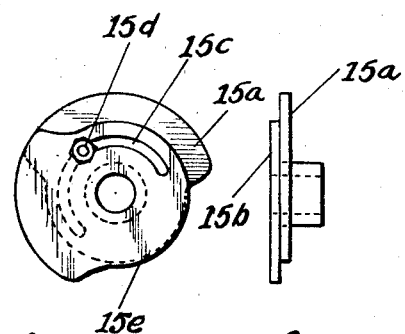

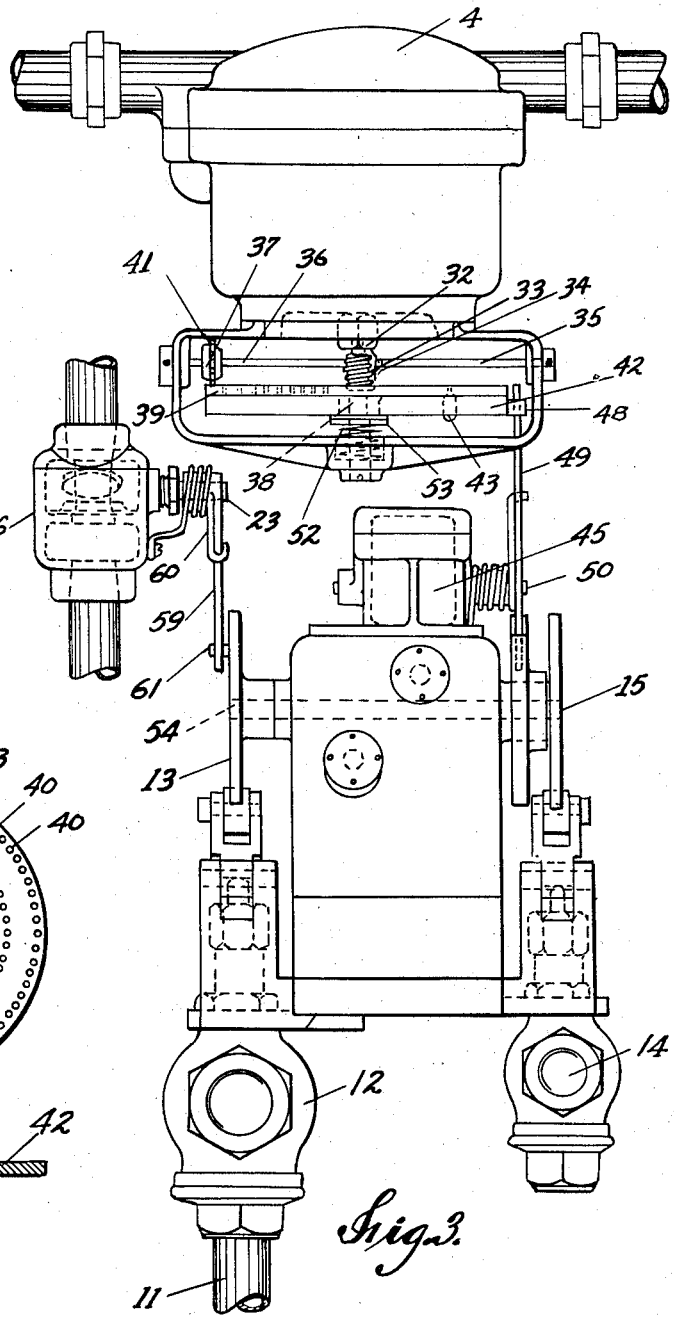

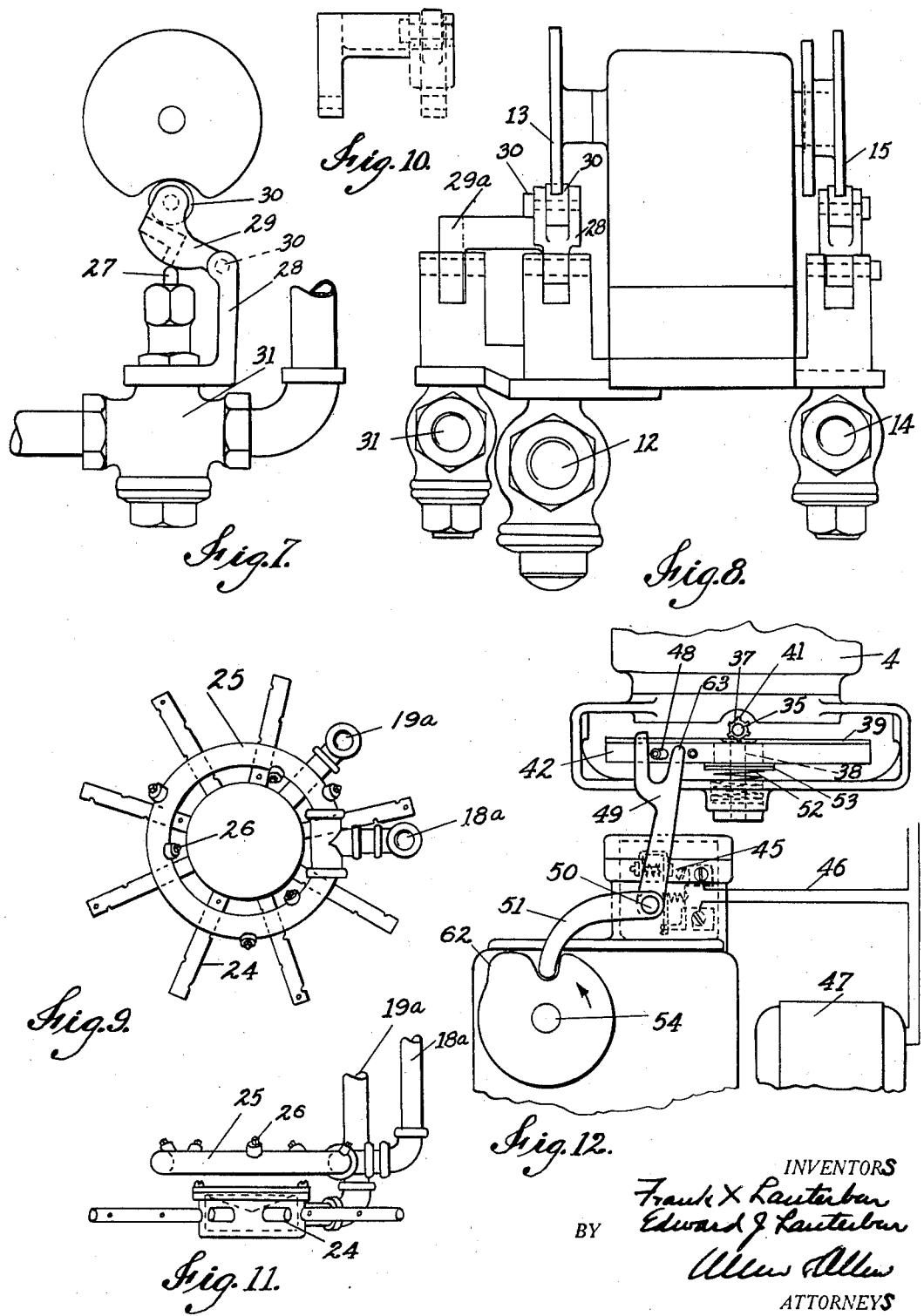

Patented Sept. 12, 1933

1,926,681

UNITED STATES PATENT OFFICE 1,926,681

WATER SOFTENING SYSTEM

Frank X. Lauterbur and Edward J. Lauterbur, Sidney, Ohio

Application April 12, 1929. Serial No. 354,622

4 Claims. (Cl. 210—24)

Our invention relates to water softening systems primarily in which base exchange silicates are employed for softening the water, and in which the base exchange silicates are intermittently revivified by means of a treatment with an alkaline reagent, such as salt, and in which mechanism is provided for automatically determining the duration of the cycles of softening and regeneration.

In our application Serial No. 248,489, filed Jan. 21, 1928, we have disclosed a system for controlling cycles of regeneration, washing and softening in accordance with the volume of soft water used. Further in our application Serial No. 317,004, filed Nov. 3, 1928, we have disclosed a system in which channeling in the softening tank is avoided by an alternate introduction of revivifying reagent at different levels within the softening tank. Our invention, as herein disclosed, relates to improvements in the systems described in the aforenoted applications in the simplicity of operation and construction of the aforesaid systems and in the adjustability of the systems to meet varying conditions of pressure, and hardness of water.

Among the specific objects of our invention is the provision of high velocity spray, the alternate use of which avoids channeling in the softening tank to a marked degree. It is among our objects to automatically regulate this high velocity spray so that at certain predetermined intervals during the regeneration period it will become effective. In connection with an automatic control for the cycles of regeneration and softening it is our object to provide a mechanical connection which will control the alternate periods of high velocity spray.

As the cycles of operation of the water softening system are, in our preferred embodiment, dependent on a time element in the form of an electric motor, it is one of our objects to provide a simple mechanical adjustment from the drive for the motor which will permit changes in the intervals of operation. There are two variations in water conditions in various localities, and at various elevations in the same locality, which make it advisable to provide on standard equipment convenient adjustments for varying the percentage time of the revivifying stage relative to the washing and softening stage, and also for varying the duration of the intervals of the successive stages of operation. One adjustment should be for varying conditions of hardness of water, and another should compensate for varying water pressure either due to variations or fluctuations in the supply or to the elevation at which the softening system is installed.

It is our object therefore to provide simple adjustments in the mechanism of the control for the cycles of operation for different degrees of hardness of water, and also to provide adjustments for varying water pressures.

The above and other objects to which reference will be made in the ensuing disclosure we accomplish by that certain combination and arrangement of parts of which we have illustrated several preferred embodiments of our invention.

Referring to the drawings:

Figure 3 is a side elevation of meter head and mechanism for controlling the cycles of regeneration and alternation.

Figure 4 is an end elevation of the alternation valve for controlling intervals of high velocity spraying of the regenerating medium.

Figure 5 is a plan view of the calibrated disc by which compensation may be made for varying degrees of hardness of water.

Figure 6 is a sectional view of the carrier plate for the calibrated disc shown in Figure 5.

Figure 7 is a detail side elevation of a preferred type of control valve.

Figure 8 is a side elevation of the motor control and cam mechanism for passing hard water to the house service during the regenerating and washing stage.

Figure 9 is a plan view of the piping within the softening tank.

Figure 10 is a detail view of the cam control mechanism for the bypass valve shown in Figure 7.

Figure 11 is a side elevation of the piping within the softening tank shown in Figure 9.

Figure 12 is a detail view of the cut out switch and cam control for use in a full-automatic control system, such as is shown in Figure 3.

Figure 13 is a side elevation of the flexible adjustable connections between the motor and the reduction gear box for varying the intervals of operation.

Figure 1:
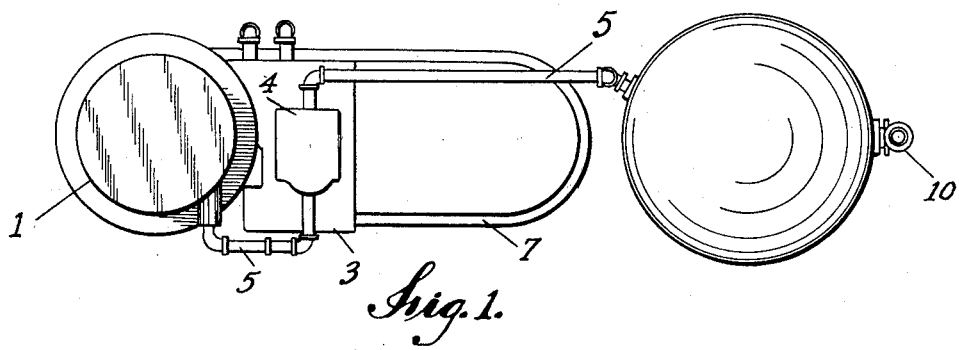
Figure 1 is a plan view of softening apparatus showing the general layout of the pressure tank, and softening and regenerating tanks.

Figures 14 and 15 indicate plan and side elevations respectively of a preferred type of adjustable cam for controlling the cycle of operation of the waste valve.

Figures 16 and 17 indicate plan and side elevations respectively of a modified type of adjustable cam for controlling the brine valve.

Referring first to the general layout of the softening system, we have shown the softening tank 1 to which water is introduced from the hard water service main through a pipe 2. There is no valve for shutting off the hard water from the service pipe to the softening tank, as the cycles of operation are controlled by valves placed on the regenerating fluid supply pipes and the waste or drain lines. The hard water supply pipe, to the softening tank however, may have a two way valve in it to control cycles of high velocity spraying during the regenerating stage, which will be hereinafter described.

The mechanism for controlling the cycles of operation of the softening system are shown as housed in a casing 3. The meter 4, through which soft water passes through a pipe 5 to the soft water pressure tank 6, controls the starting of an electric motor, housed within the casing. The brine tank is indicated at 7 and a pipe 8 is indicated through which brine solution or other regenerating fluid is drawn into the hard water supply pipe. Further, there is diagrammatically indicated a supply pipe 9 through which water is introduced to dissolve the chemical regenerating material in the brine tank. The soft water line to the house service is indicated at 10. It may have a check valve in it to prevent water from flowing back from the soft water service during regeneration and softening.

Figure 2:
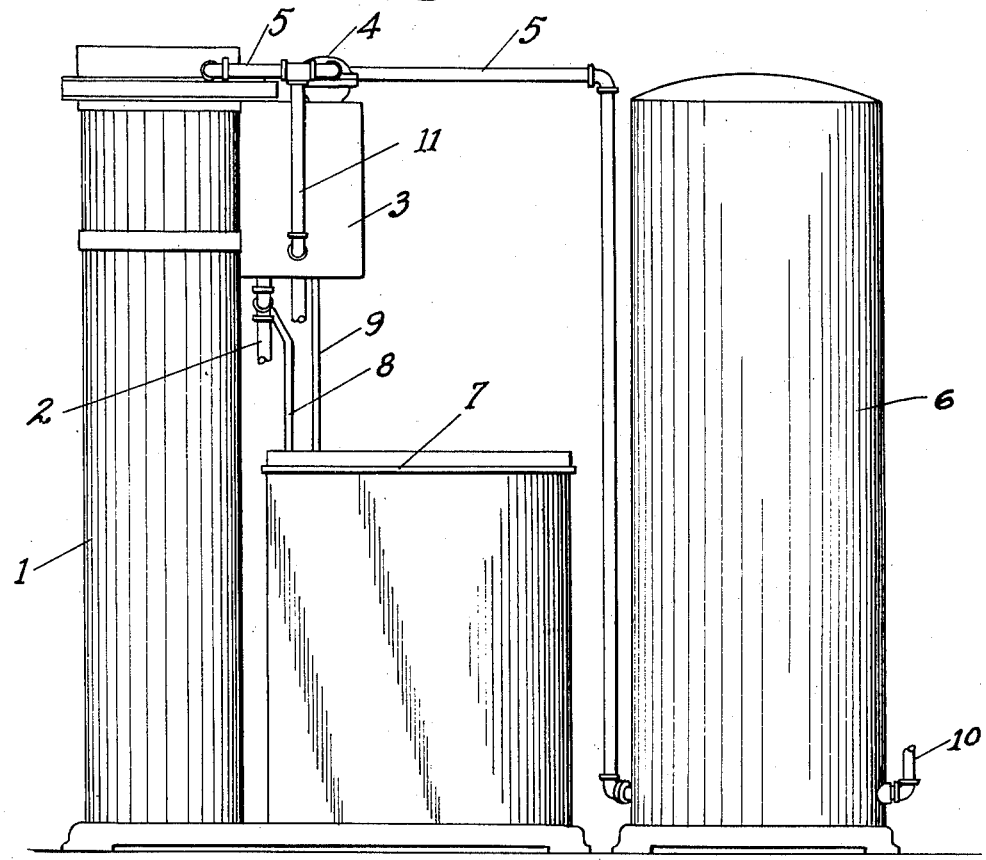
Figure 2 is a side elevation of the layout indicated in Figure 1.

The general arrangement of piping is disclosed in our co-pending applications and plays no part in the invention in which it is our object to disclose herein. Our present invention relates more to the mechanism housed within the casing 3, and to improvements in the adjustability of the controls for varying conditions. Referring now to Figure 3 and to the other detail views, we have indicated the waste or drain line at 11. A tee, shown in Figures 1 and 2, on the soft water line to the meter, provides an outlet from the tank 1 to the valve 12, which, during cycles of operation, is opened and closed by the cam 13. The brine valve which during cycles of regeneration is opened, is indicated at 14, having a control cam 15 therefor. A two way valve 16 is also indicated which changes the course of the regenerating fluid or inlet hard water supply to cause the period of high velocity spraying to break down the tendency for channeling to result.

We have shown in Figure 4 one type of two way valves which consists of a housing having a single inlet port 17, and two discharge ports 18 and 19 connecting with the pipes 18a, 19a, and controlled by the valves 20 and 21 respectively, which are mounted on a rocker 22. The rocker is mounted on a pivot pin 23 which may be rocked back and forth to cause water to flow either through the discharge pipe 18a, or the discharge pipe 19a. One of the pipes leads to a distributing head 24 located in the bottom of the softening tank and the other leads to a high velocity nozzle 25 having a series of restricted spray orifices 26; which, particularly when the pressure is released, cause water passing through the nozzle to be violently projected against the base exchange silicates breaking down channeling.

The valves on the brine line and on the waste pipe are preferably of the normally closed type, as indicated in Figure 7, having a valve rod 27 which, when depressed, unseats the valve. A bracket 28 is secured on the valve bonnet and a pivoted arm 29 pivoted in the bracket at 30 carries a roller which engages the surface of the cam, and, as will be understood, permits the valve to close during intervals when the roller rides down into the low portion of the cam, but otherwise holds the valve open. In Figures 7 and 8 we have shown a by-pass valve generally indicated at 31, which allows hard water to pass directly to the house service line, linked up with the waste line valve mechanism which engages the waste valve cam. This makes desirable arrangement as when a by-pass valve is required, it is only required to be open during periods when the tank is being regenerated and washed and during both of these intervals the waste valve is open. An extension 29a of the arm 29 bears against the by-pass valve stem and thus opens and closes the by-pass valve coincidently with the opening and closing of the waste line valve.

The general arrangement for controlling the cycles of operation of the waste, drain and alternating valves is in accordance with the system described in our copending applications. The meter 4 has a shaft 32 which is suitably geared with reference to the mechanism of the meter, so that with the usage of a certain predetermined amount of soft water, the mechanism will start the operation inducing the cycles of regeneration and washing. On the shaft 32 we have mounted a worm drive gear 33, which engages a worm 34 mounted on a shaft 35. The shaft 35 has a key and key way 36 therein which holds a sprocket wheel 37 in slidable but non-rotative position on the shaft.

Below the shaft we have mounted, on a spindle 38, a disc 39, which as indicated in Figure 5 has a series of concentric orifices 40 or depressions therein. Each series is spaced so that the orifices therein will register with the teeth 41 of the sprocket wheel 37. It will be apparent, therefore, that the outer series will have more orifices in it than the series nearer the center of the disc, and that the sprocket drive for the disc will cause more rapid rotation of the disc relative to a given rotation of the shaft 32, the closer it is engaged toward the center of the disc. There may be, for example, one hundred orifices in the outer series and twenty-five in the inner most of the series. The rate of rotation of the disc will consequently be one fourth as fast when the sprocket is seated in the outermost series of orifices, than when it is seated in the innermost, and by calibrating the series of orifices relative to the hardness of the water to be treated, the cycles of operation of the control mechanism will be four times as frequent when the sprocket is seated in the innermost series than when it is seated in the outermost.

As an example of how simple it will be to adjust for various degrees of hardness, if, in one locality the hardness is eight grains, the device may be set with the sprocket in the outermost series, while if, in another locality the hardness is thirty two grains, the sprocket will be set in the innermost series. The intervening series of orifices may, of course, be graduated for degrees of hardness between the eight grains and thirty two grains. The example given is merely for purposes of example, as it will be apparent that, with the system noted any desired ranges of hardness may be suitably calibrated.

Below the disc 39 we have provided a carrier plate 42, which has a lug 43 which extends within a slot 44, in the calibrated disc. The length of the slot will be sufficient to allow the carrier plate to be carried on beyond a dead center position of the tripping mechanism for the electric switch 45, which is connected with wires 46 to the electric motor 47, which drives the cam operating mechanism, as will be hereinafter described. Extending from the periphery of the carrier plate there is a lug 48, which trips a forked lever 49 which closes the switch 45. Fixed on the pivot shaft 50 of the forked lever 49 there is an arm 51 which engages one of the cams of the mechanism which is set in operation when the electric motor 47 is started up.

Referring to Figure 12, which best indicates the necessity of the hereinbefore described mechanism it may be stated that if the meter was merely provided with a mechanical connection to close the electric switch of the cam operating mechanism without any provision for resetting the tripping mechanism for the next cycle of operation, while the motor might be stopped the tripping mechanism would not be set for the next cycle of operation.

There is a spring 52 which presses upwardly against the hub 53 of the carrier plate 42, so that in setting the sprocket for a desired series of orifices the carrier plate and calibrated disc may be pressed down to allow sufficient clearance for the desired setting.

When the motor is started up, it drives a series of reduction gears within the casing 3, which control the operation of the cam shaft 54 on which the control cams are mounted. As a preferred type of drive from the motor to a shaft 55 of the reduction gear box, we have indicated in Figure 13 a series of pulleys 56 on the motor shaft, having different diameters, and a series of pulleys 57 on the reduction gear drive shaft, also having different diameters with a flexible belt 58 driving the gear reduction shaft. By moving the belt from one set of pulleys to another the speed of operation of the cam shaft 54 may be varied. Such an adjustment permits the owner of the establishment in which the softener is located to increase or decrease the intervals of cycles of regeneration and softening, depending on variations in water pressure, and by positioning of the flexible belt a longer or shorter ratio of periods of operation may be readily brought about. This is merely one example of the many advantages of providing a manually and quickly adjustable connection between the driving motor and the cam operating mechanism.

We have indicated in Figures 14 to 17 preferred types of adjustable cams for the waste and brine valves. In Figures 14 and 15 we have shown two cam discs 13a, 13b. The cam disc 13a may be fixed on the cam shaft 54 and the cam disc 13b provided with an arcuate slot 13c, which through a nut 13d permits the cam disc 13b to be rotated relative to the cam 13a and fixed by means of the nut 13d with a desired low portion 13e on the compound cam.

In Figures 16, 17, we have shown a cam disc 15a fixed on the cam shaft 54 with a cam disc 15b adjustable relative thereto by means of a slot 15c and nut 15d which also permits adjustment for a variable size of the low portion 15e of the compound cam. Thus, we may provide cam adjustments which will permit variations in the relative timing of the cycles of operation of washing and regeneration.

In Figure 3 we have shown a preferred control for the two way valve, which during certain intervals directs the flow of liquid through the nozzle 24 and then throughout other intervals directs the flow of liquid through the high velocity sprayer head 25. The valve rocker pin 23 has attached thereto a lever 59 which is preferably tensioned with a spring 60. During the rotation of the cam 13, a lug 61 mounted on the outer surface of the cam trips the valve rocker lever and changes the direction of flow of the liquid within the softening tank.

The operation of the automatic system, as has been stated, consists in controlling the cycles of starting of the motor actuating the cam mechanism by means of a connection with the meter on the soft water line. In a semi-automatic system the switch 45 may be closed by a push button in the house. When the meter has turned to such a position that the predetermined amount of soft water has been used, the sprocket turns the calibrated disc so that the carrier plate lug 43 is picked up at the end of the slot 44. The lever 49 then closes the switch to the motor and the motor starts to rotate. The brine valve and waste valves are then opened for the required periods. Near the end of the revolution of the cam, the arm 51 moves up over the high portion 62. The forked arm 49 rocks clockwise as indicated in Figure 12, advancing the disc 42 to the limit of movement of the lug 43 in the slot 44 and allowing the end 63 of the lever 49 to clear a position in which it would block further movement of the lug and further rotation of the disc. The end of the arm 51 then drops into the depression in the cam, the contact in the control switch is broken, and the motor caused to stop. Then after the meter disc has rotated, due to the use of soft water, the pin 48 engages the end 63 of the lever, closing the contact switch starting the motor, then the end of the arm 51 rides along the cam holding the switch in contact.

While we have shown only our preferred mechanism for automatically controlling the cycles of operation of a water softening system, it will be understood that we include within the scope of our invention such mechanical modifications as will occur to others skilled in this art.

Having thus described our invention, what we claim as new and desire to secure by Letters Patent, is:—

1. In a water softening system having a meter control, and electrically actuated mechanism controlled by said meter control for controlling cycles of regeneration and washing, means for adjusting said mechanism for varying its rate of rotation relative to said meter control to compensate for different water pressures, said means comprising an electric motor and a reduction gear box with variable speed mechanism therebetween comprising driving and driven pulleys of different diameters and a flexible driving belt.

2. In a direct pressure water softening system having electrically actuated mechanism for controlling cycles of regeneration and washing and with means for setting said mechanism in operation, means for adjusting said mechanism for different water pressures, said means comprising an electric motor and a reduction gear box with variable speed mechanism therebetween, comprising driving and driven pulleys of different diameters and a flexible driving belt.

3. In a water softening system having a meter control, and electrically actuated mechanism, controlled by said meter control, for controlling cycles of regeneration and washing, means for quickly adjusting said mechanism for varying its intervals of rotation relative to said meter control to compensate for different degrees of hardness of water, comprising a disc having series of orifices arranged in spaced concentric groups, and adjustable means, driven by said meter for engaging said spaced orifices.

4. In combination with a water softening tank containing base exchange silicates, means for preventing channeling in said tank comprising a nozzle through which a high velocity spray of liquid may be introduced, said tank having a low velocity spraying nozzle and a two way valve through which liquid may be sprayed through said high velocity sprayer and said low velocity sprayer alternately.

FRANK X. LAUTERBUR.
EDWARD J. LAUTERBUR.